United States Patent
Christophe

(10) Patent No.: US 9,392,119 B2
(45) Date of Patent: Jul. 12, 2016

(54) ENHANCED VISUAL VOICE MAIL

(75) Inventor: Le Thierry d'Ennequin Christophe, Paris (FR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/234,934

(22) PCT Filed: Jul. 17, 2012

(86) PCT No.: PCT/KR2012/005709
§ 371 (c)(1), (2), (4) Date: Feb. 4, 2014

(87) PCT Pub. No.: WO2013/015555
PCT Pub. Date: Jan. 31, 2013

(65) Prior Publication Data
US 2014/0192967 A1   Jul. 10, 2014

Related U.S. Application Data

(60) Provisional application No. 61/511,969, filed on Jul. 26, 2011.

(51) Int. Cl.
H04M 1/64 (2006.01)
H04M 3/533 (2006.01)

(52) U.S. Cl.
CPC ...... *H04M 3/533* (2013.01); *H04M 2203/4581* (2013.01)

(58) Field of Classification Search
CPC .. H04M 3/533; H04M 3/53333; H04M 3/436
USPC .......................................... 379/88.11, 88.12
See application file for complete search history.

(56) References Cited

U.S. PATENT DOCUMENTS

| | | | |
|---|---|---|---|
| 5,742,668 | A | 4/1998 | Pepe et al. |
| 6,181,781 | B1 | 1/2001 | Porter et al. |
| 7,103,154 | B1 | 9/2006 | Cannon et al. |

(Continued)

FOREIGN PATENT DOCUMENTS

| | | | |
|---|---|---|---|
| JP | 10-178488 A | 6/1998 | |
| JP | 2002-366495 A | 12/2002 | |

(Continued)

OTHER PUBLICATIONS

Open Mobile Alliance, "Enhanced Visual Voice Mail Requirements", Open Mobile Alliance Ltd., Candidate Version 1.0, May 11, 2011, OMA-RD-EVVM-V1_0-20110511-C, pp. 1-30.

(Continued)

*Primary Examiner* — Van D Huynh
(74) *Attorney, Agent, or Firm* — Birch, Stewart, Kolasch & Birch, LLP

(57) ABSTRACT

In order to support Enhanced Visual Voice Mail (EVVM) technology in OMA standards that allow for voicemail retrieval via a plurality of devices for a single user, a method and apparatus for generating a notification that includes an old identification value (UID) for an old message, a new identification value (UID) for a new message, and optional additional information related to the notification; and transmitting, independent of an IMAP synchronization procedure with a first device, said notification to at least one other device that is different from the first device, has been conceived.

6 Claims, 5 Drawing Sheets

(56) References Cited

U.S. PATENT DOCUMENTS

| | | |
|---|---|---|
| 2002/0174184 A1 | 11/2002 | Bouchard |
| 2003/0028602 A1 | 2/2003 | Bhattacharya |
| 2003/0087632 A1 | 5/2003 | Sagi et al. |
| 2004/0260780 A1* | 12/2004 | Eisen .................. G06Q 10/109 709/207 |
| 2008/0205610 A1* | 8/2008 | Bishop .................. H04L 51/24 379/93.24 |
| 2008/0307061 A1 | 12/2008 | Jacovi et al. |
| 2010/0150322 A1* | 6/2010 | Yin ....................... H04M 3/533 379/88.14 |

FOREIGN PATENT DOCUMENTS

| | | |
|---|---|---|
| JP | 2004-48684 A | 2/2004 |
| JP | 2004-537099 A | 12/2004 |
| JP | 2005-509376 A | 4/2005 |

OTHER PUBLICATIONS

Open Mobile Alliance, "Enhanced Visual Voice Mail: Architecture and Technical Specification", Open Mobile Alliance Ltd., Draft Version 1.0, Jul. 24, 2011, OMA-ER-EVVM-V1_0-20110724D, pp. 1-30.

* cited by examiner

ENHANCED VISUAL VOICE MAIL

CROSS REFERENCE TO RELATED APPLICATIONS

This application is the National Phase of PCT/KR2012/005709 filed on Jul. 17, 2012, which claim priority under 35 U.S.C. 119(e) to U.S. Provisional Application No. 61/511,969 filed on Jul. 26, 2011, all of which are hereby expressly incorporated by reference into the present application.

TECHNICAL FIELD

The present application is related to a enhanced visual voice mail.

BACKGROUND ART

This technical description relates to improvements in processing multimedia contents. In the conventional art techniques, retrieval of multimedia contents via a plurality of devices for a single user was not optimal.

DISCLOSURE OF INVENTION

Solution to Problem

In order to process and support various types of multimedia contents, such as Enhanced Visual Voice Mail (EVVM) technology in OMA standards that allow for voicemail retrieval via a plurality of devices for a single user, a user device is implemented with a receiver configured to receive, from a server, a notification that includes an old identification value (UID) for an old message, a new identification value (UID) for a new message, and optional additional information related to the notification, and a processor configured to cooperate with the receiver to process the information in the received notification.

MODE FOR THE INVENTION

Figure 1:
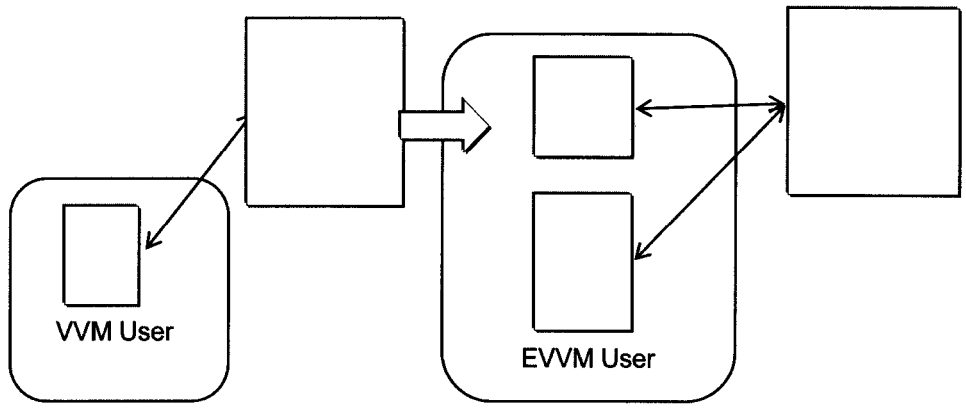
FIG. 1 depicts that Enhanced Visual Voice Mail (EVVM) introduces the possibility for the user to have multiple EVVM Clients.

FIG. 1 depicts that Enhanced Visual Voice Mail (EVVM) introduces the possibility for the user to have multiple EVVM Clients. As such, the EVVM Enabler should provide support for multi-device environments. Some technical solutions that work in ordinary or previously available Visual Voice Mail (VVM), where the user always has only one device, raise new problems in EVVM (where the user may have several devices).

Figure 2:
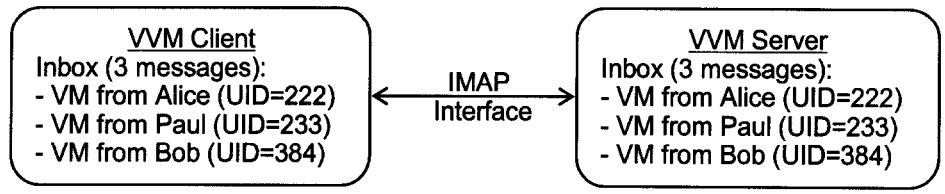
FIG. 2 depicts the background of voicemail technology.

FIG. 2 depicts the background of voicemail technology, for example, in VVM, voicemails are stored in an IMAP server. Each voicemail has a unique identifier called "UID" and voicemails cannot be modified.

Figure 3:
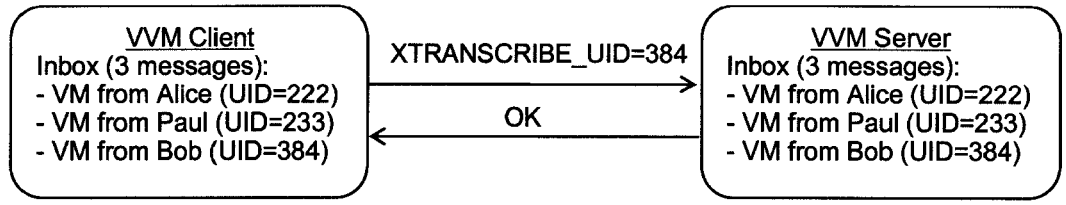
FIG. 3 depicts voicemail transcription in VVM.

FIG. 3 depicts voicemail transcription in VVM, whereby the user can request to transcribe voicemail into text messages, by sending a custom IMAP command, such as, "XTRANSCRIBE_UID". For example, the user asks the server to transcribe the voice mail whose UID is 384.

The transcription is useful for a situation where the user watches a displaying unit such as a television or a monitor of the computer (or a laptop or a desktop). Especially, when the user watches the news on the television, the user may not wish to be disturbed. As such a situation, the transcription of the voicemail to the text is very helpful for the user. In more detail, after transcription of the voicemail to the text, the television may display the text as a banner. In other words, the television may display the text in manner of subtitles or caption.

Figure 4:
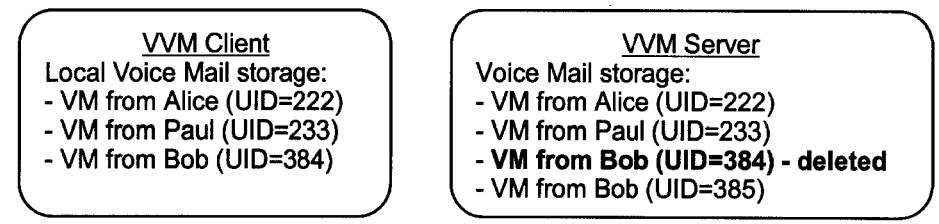
FIG. 4 shows the processing related to the XTRANSCRIBE_UID command.

FIG. 4 shows that upon receiving the XTRANSCRIBE_UID command, the VVM Server will: 1) transcribe the voice content into text content; 2) delete the old Voice Mail (with UID 384); and 3) create a new Voice Mail that includes both voice and text content.

The new voice mail (with UID=385) contains a specific header called "X-Original-Msg-UID". Such is used in case the message is the result of on-demand (asynchronous) transcription that replaced an original voice message. It contains the UID of that original voice message which no longer exists in the voicemail system (and may exist in the client cache). It should be noted that this header is optional and that the current message contains both the voice message and the text transcription.

During synchronization, the VVM Client can will discover that the message with UID=384 has been deleted, based on the X-Original-Msg-UID header included in message with UID=385. The following exemplary format may be used:

Message with UID=385:
UID: 385
From: Bob
Date: Mon, 25 December
X-Original-UID: 384
subject: voice mail
. . . .

Figure 5:
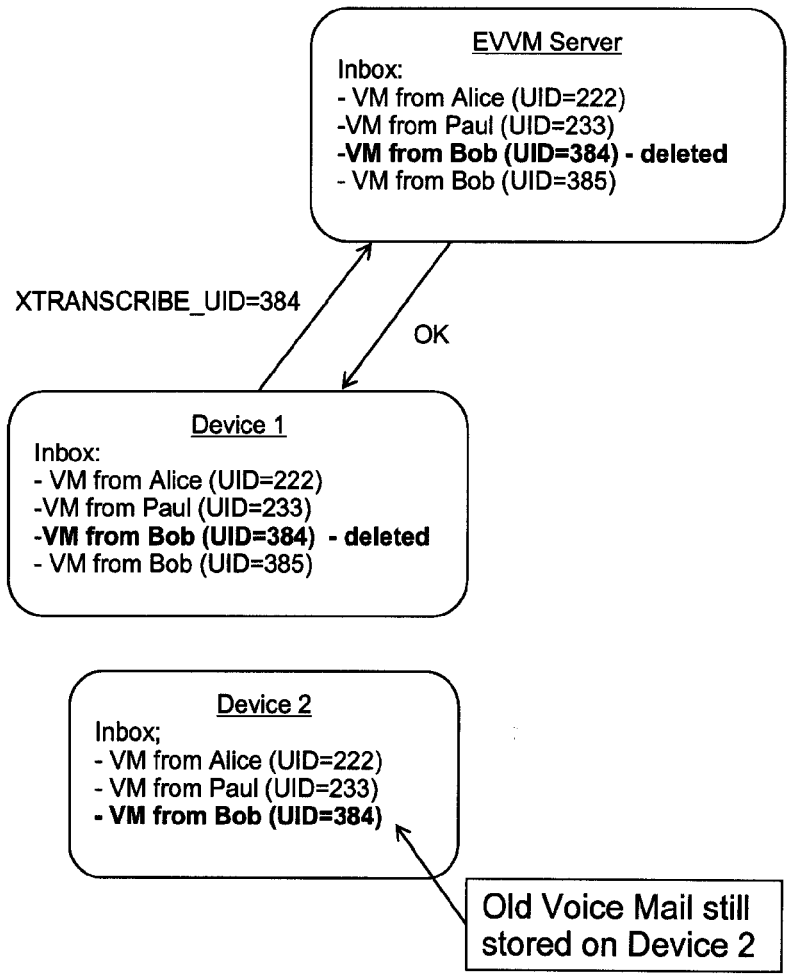
FIG. 5 shows that in EVVM, the solutions explained above will raise issues due to the multi-devices environment.

FIG. 5 shows that in EVVM, the solutions explained above will raise issues due to the multi-devices environment. For explanatory purposes, the following pre-conditions shall be assumed: the user has 2 devices (device 1 and device 2), and the voicemail with UID 384 was transcribed from device 1. In such case, there may be some drawbacks.

Figure 6:
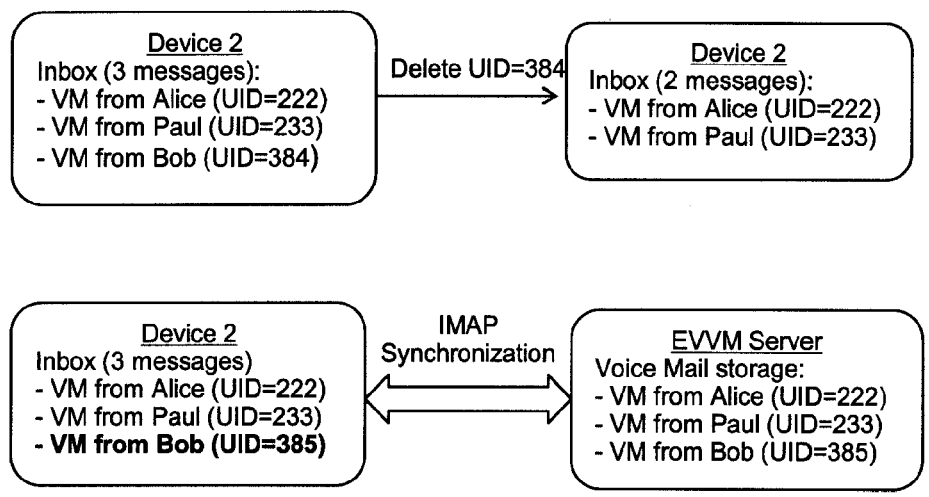
FIG. 6 shows that there is a problem after message deletion.

As per FIG. 6, there is a problem after message deletion. According to an exemplary use case, if the user deletes the Voice Mail with UID=384 from Device 2, and then Device 2 synchronizes with the Server. However, after synchronization, the message from Bob appears again on Device 2, even though the user deleted it.

Figure 7:
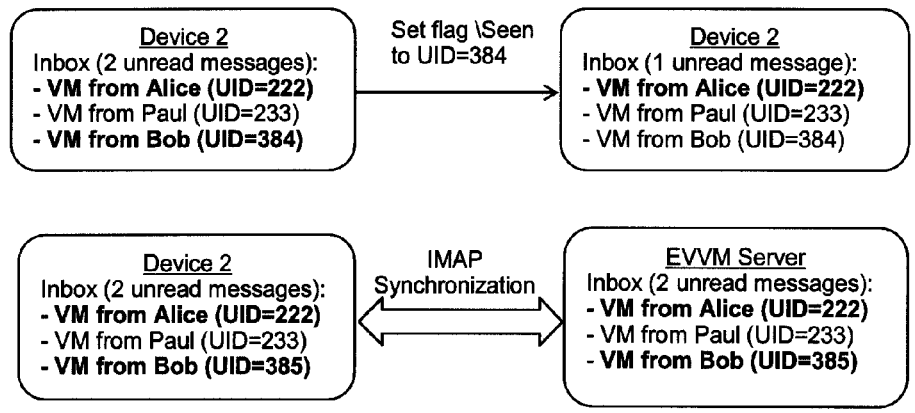
FIG. 7 shows that flag information loss may occur.

As per FIG. 7, flag information loss may occur. In a use case, if the user sets the flag "\Seen" to the message 384 from Bob, then, Device 2 synchronizes with Server. However, after synchronization, the message 385 from Bob appears as unread, even though this message was already read by the user.

Figure 8:
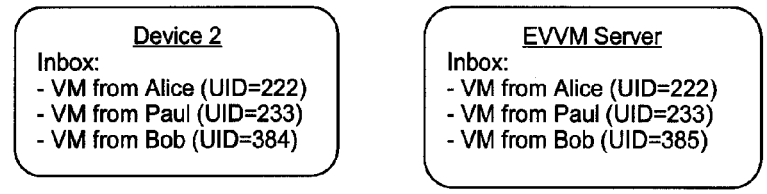
FIG. 8 shows that failure when sending attachments may occur.

As per FIG. 8, failure when sending attachments may occur. In a use case, if the user composes a new Voice Mail, and attaches the Voice Mail from Bob, then the user sends the new VM to the server, including a reference to the VM from Bob (with UID=384). However, the server does not know any message with UID=384, and thus the requests fails.

The three exemplary issues described above are due to the fact that the same message is stored with different UIDs on multiple devices. Thus, in order to avoid this situation, devices should be aware of the existence of the new version of the transcribed message before synchronization.

Figure 9:
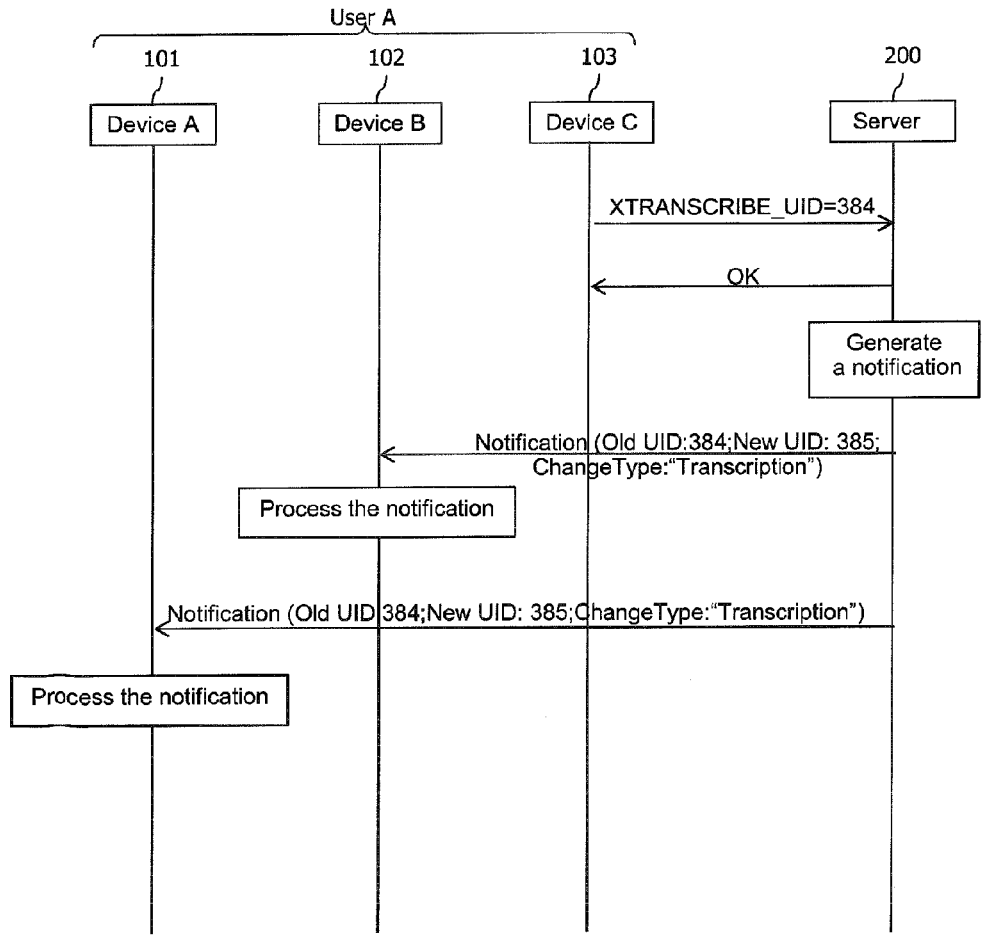
FIG. 9 shows the message flow between the server and multiple devices that address the conventional art problems.

Referring to FIG. 9, as a practical solution, it is proposed that when the server 200 replaces an old message by a new message (e.g., as a result of a transcription request), a notification can be sent to the devices 101, 102 and 103 of the user.

In more detail, a user A owns a device A 101, a device B 102 and a device C 103.

For example, let assume that the device A 101 may be a mobile communication device, the device B 102 may be a portable displaying device and the device C may be a television.

If the device C 103 such as the television receives a voice mail, the user A of the device C 103 displays a alarm for the reception of the voice mail or outputs a sound for the reception of the voice mail.

At this time, the user may not wish to be disturbed by having to listen the voice mail. Accordingly, the user A may request to transcribe voicemail into text messages, by sending a custom IMAP command, such as, "XTRANSCRIBE_UID" via the device C 103. For example, the user requests the server to transcribe the voice mail whose UID is 384.

The server 200 responds to the request, by sending a response message, i.e., an OK message (e.g., 200 OK message).

And then, the server generates a notification and transmits the generated notification to the devices of the user A, i.e., the device A 101 and the device B 102, respectively.

For example, the format of the notification can be as follows:

OldUID: <value>;
NewUID: <value>;
[ChangeType: <value>]+ whereby "OldUID" is the value of the UID of the original message, "NewUID" is the value of the UID of the new message, and "ChangeType" indicates what was the transformation between the old and the new message.

The devices A and B process the received notification, respectively.

Currently, only the "Transcription" operation is defined, while other values could be defined in the future (e.g. "content adaptation", "translation", . . . )

Figure 10:
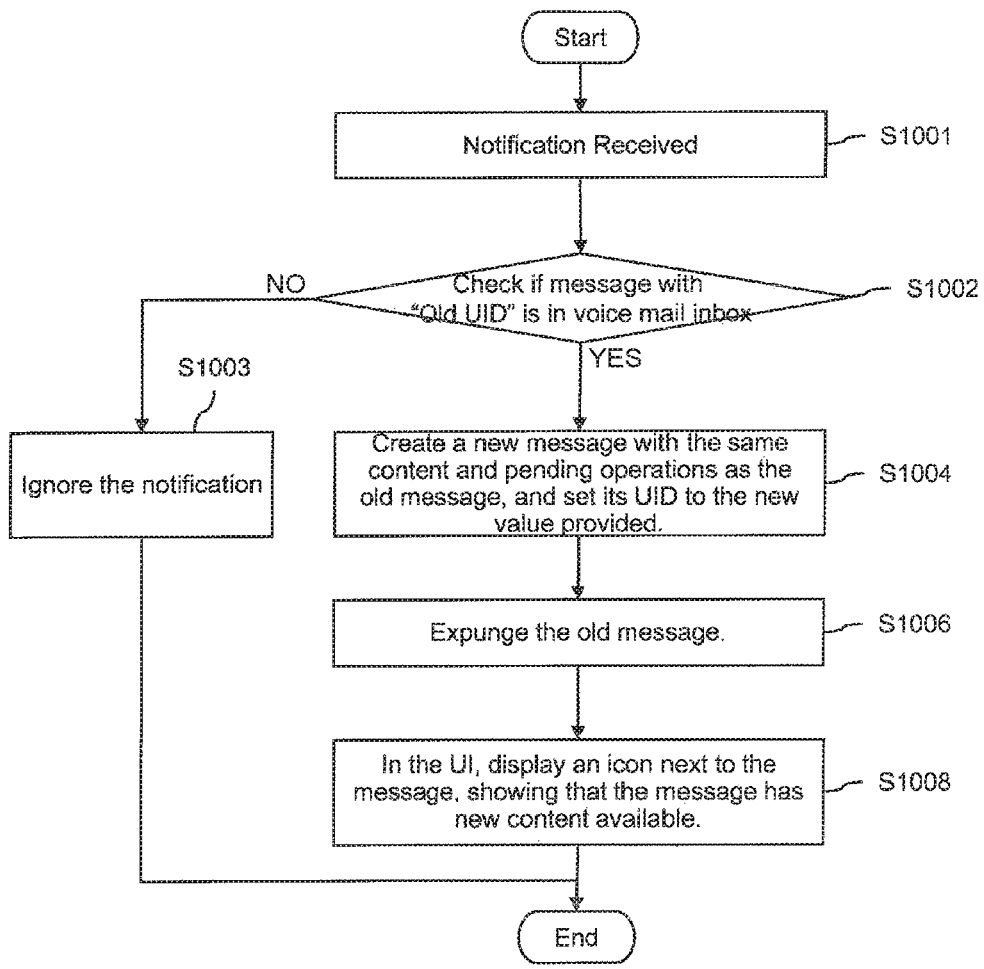
FIG. 10 depicts a flow chart of the procedures according to the present invention.

FIG. 10 depicts a flow chart of the procedures according to the present invention. Upon receiving notification (S1001), the voicemail inbox is checked to see if a message with the old UID is stored (S1002). If no such message is found, the notification is ignored (S1003). However, if such message is found, a new message is created with the same content and pending operations as the old message (S1004). Also, its UID is set to the new value provided. Then, the old message is expunged from the inbox or memory (S1006). Finally, in the user interface, an icon or other indication is displayed next to the message to indicate that the message has new content available (S1008).

Hereafter, the issue of synchronization of "deprecated" messages will be explained. The old message is considered as expunged => no synchronization is needed. Accordingly, all pending operations (e.g., flag as "read", flag as "deleted") that were done locally on the old message are applied to the new message.

For example, as a pre-condition, the memory of the IMAP client before receiving a notification may contain the following information:

TABLE 1

| Message UID | From | Date | Pending operations |
| --- | --- | --- | --- |
| 245 | Bob | 24 Dec. | SET\SeenSET\Answered |
| 243 | Alice | 25 Dec. | — |

Then, it is assumed that the notification (having the following format) is received:

OldUID: 245;
NewUID: 256;
ChangeType: "transcription"

As a result, the message with UID 245 is expunged and a new message with UID 256 is created. The operations that were pending on the old message are applied to the new message. After receiving the notification, the memory of the IMAP client should look as follows (whereby the old message has been removed from memory):

TABLE 2

| MessageUID | From | Date | Pending operations |
| --- | --- | --- | --- |
| — | | | |
| 243 | Alice | 25 Dec. | — |
| 256 | Bob | 24 Dec. | SET\SeenSET\Answered |

Figure 11:
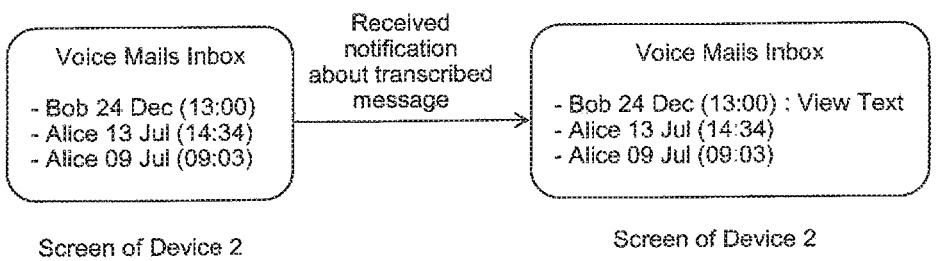
FIG. 11 shows an exemplary graphical user interface (UI).

FIG. 11 shows an exemplary graphical user interface (UI). Based on the value of "ChangeType" specified in the notification, a specific icon can be shown next to the corresponding message.

In summary, is should be noted that providing improvements for Enhanced Visual Voice Mail (EVVM) techniques are ongoing in the OMA standard. As such, voicemail can be retrieved from any of the user's devices, whereas VVM only allows retrieval from one device. Also, using EVVM, creation of voicemail including attachments without having to upload to server becomes possible. Here, the server can retrieve contents by reference from somewhere else. The server generates a UID for each voicemail. Meanwhile, speech-to-text conversion (or transcribing) is also possible. Such can be performed automatically or in response to user request.

Under old IMAP techniques, voicemail cannot be modified, so upon transcribing, a new message must be created. Namely, only the old voicemail message is deleted, while the new voicemail contains both voice and text. To address certain problems related to EVVM, the concepts proposed herein allow the server to send out a notification to all devices. For example, such may be sent via SMS or the like before synchronization. This notification includes the old UID, the new UID, and "optional" additional information. Here, the old message can be considered to be a "deprecated" message, and under the old IMAP technology, old messages could not be modified.

It can be said that the inventive concepts described herein allow for implementation of a method for a server comprising: generating a notification that includes an old identification value (UID) for an old message, a new identification value (UID) for a new message, and optional additional information related to the notification; and transmitting, independent of an IMAP synchronization procedure with a first device, said notification to at least one other device that is different from the first device.

Here, the IMAP synchronization procedure comprises: sending, to the first device, the new message comprising contents of the old message and new contents; and receiving, from the first device, a confirmation regarding the new message. The method may further comprise, prior to the generating step: receiving, from the first device, a request to process the old message; processing the old message based on the received request; and sending, to the first device, a confirmation that the old message has been processed. The processing of the old message comprises: transcribing voicemail contents into text, or translating the voicemail contents into another language. The additional information related to the notification comprises: a reason for the notification, or a change type for the old message. The generating and transmitting of the notification supports Enhanced Visual Voice Mail (EVVM) technology in OMA standards that allow for voicemail retrieval via a plurality of devices for a single user. The server can be configured to perform the method steps described above.

Also, there is provided a method comprising: sending, to a server, a request for processing an old message; receiving, from the server, a new message resulting from processing the old message at the server; displaying information about both the old message and the new message (such as, showing a movie and a message at the same time); and deleting old message. Accordingly, from device A to B, seamless viewing of multimedia contents is possible, in contrast to CPM techniques.

Here, the processing of the old message comprises: transcribing voicemail contents into text, or translating the voicemail contents into another language. The displaying of information about both the old message and the new message allows for simultaneous viewing of different types of multimedia contents or for seamless viewing of the same contents via multiple devices.

Additionally, there is provided a device comprising: a display; a transceiver configured to send, to a server, a request for processing an old message, and to receive, from the server, a new message resulting from processing the old message at the server; and a processor configured to cooperate with the display and the transceiver to display information about both the old message and the new message, and to delete the old message.

Furthermore, there is provided a method comprising: receiving, from a server, a notification that includes an old identification value (UID) for a voice message, a new identification value (UID) for a new message, and optional additional information related to the notification wherein the new message has been generated by converting the voice in the voice message into a text by the server; and processing the information in the received notification.

Here, the additional information related to the notification comprises a reason for notification. The step of processing the information in the received notification comprises at least one among propagating pending operations including flag changes from old message to new message, and displaying an icon next to corresponding message indicating that new content is available.

Also, a device comprising: a receiver configured to receive, from a server, a notification that includes an old identification value (UID) for a voice message, a new identification value (UID) for a new message, and optional additional information related to the notification wherein the new message has been generated by converting the voice in the voice message into a text by the server; and a processor configured to cooperate with the receiver to process the information in the received notification can be implemented.

The explained methods of the present invention may be implemented by using, computer software, hardware, or some combination thereof. For instance, the method of the present invention may be stored in a storage medium (e.g., inner memory, flash memory, hard disc, etc.), or may be implemented in codes or commands inside a software program that can be executed by a processor (e.g. micro processor). This will be explained in more details with reference to FIG. 12.

Figure 12:
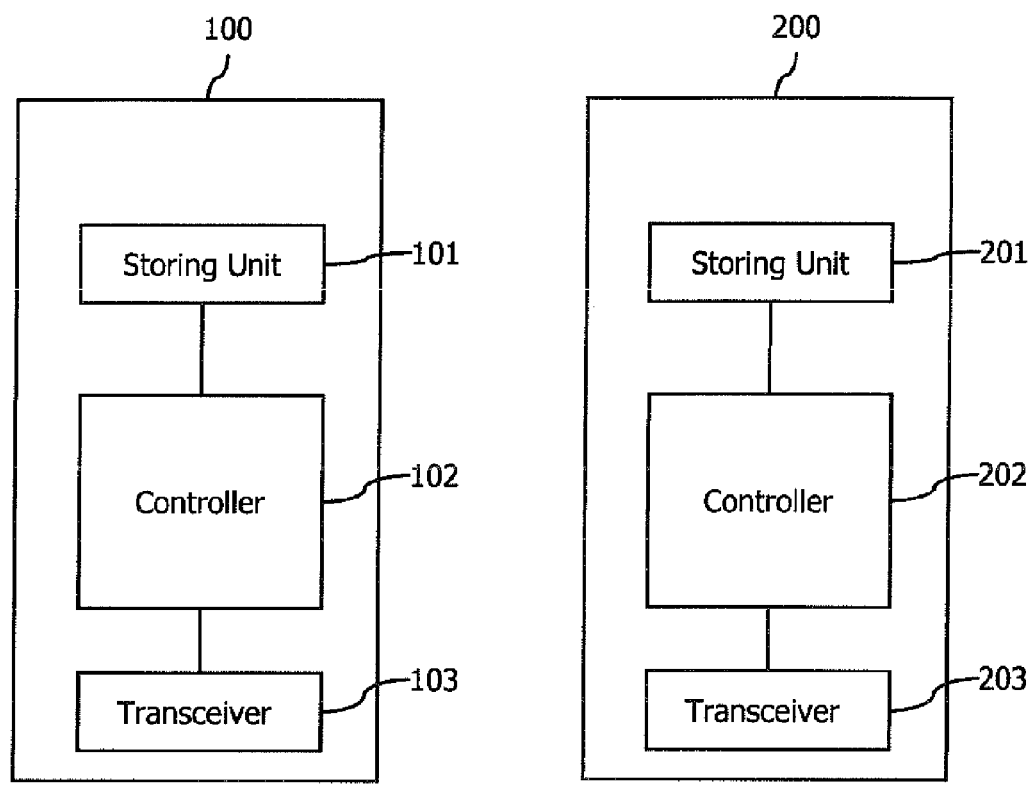
FIG. 12 is a block diagram illustrating configurations of a device and the smart grid 600.

FIG. 12 is a block diagram illustrating configurations of a device 200 and a server 600.

As shown in FIG. 12, the device 100 includes a storage means 101, a controller 102 and a transceiver 103. And, the server 200 includes a storage means 201, a controller 202 and a transceiver 203.

The storage means 102 and 202 are configured to store therein the methods.

The controllers 102 and 202 is configured to control the storage means 101 and 201, and the transceivers 103 and 203. More specifically, the controllers 102 and 202 execute the methods stored in the storage means 101 and 201, respectively. And, the controller 102 and 102 transmit the aforementioned signals via the transceivers 103 and 203

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

INDUSTRIAL APPLICABILITY

The features and concepts herein are applicable to and can be implemented in various types of user devices (e.g., mobile terminals, handsets, wireless communication devices, etc.) and/or network devices, entities, components, etc. that can be configured to support Enhanced Visual Voice Mail (EVVM) technology in OMA standards that allow for voicemail retrieval via a plurality of devices for a single user.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:
1. A method, comprising:
receiving, by a server from a first device, a request to process an old message;
after reception of the request, transcribing, by the server, voicemail contents of the old message into text for a new message;
sending, by the server to the first device, a confirmation that the voicemail contents of the old message have been transcribed into the text for the new message;
after sending the confirmation, generating, by the server, a notification that includes an old unique identification (UID) value for the old message, a new UID value for the new message, and a change type value indicating a type of transformation from the old message to the new message; and transmitting, by the server, independent of an Internet message access protocol (IMAP) synchronization procedure with the first device, the generated notification to a second device that is different from the first device, wherein upon receiving the generated notification by the second device, the second device determines whether a message having the old UID value is stored in a voicemail inbox, wherein if the message having the old UID value is determined by the second device to be stored in the voicemail inbox, the message having the old UID value is expunged, and the new message with the new UID value is created, and wherein a specific icon is displayed next to the new message based on the change type value included in the notification.

2. The method of claim 1, wherein the IMAP synchronization procedure comprises:

sending, to the first device, the new message comprising contents of the old message and new contents; and receiving, from the first device, a confirmation regarding the new message.

3. The method of claim 1, wherein the generating and transmitting of the notification supports Enhanced Visual Voice Mail (EVVM) technology in Open Mobile Alliance (OMA) standards that allow for voicemail retrieval via a plurality of devices for a single user.

4. A server, comprising:

a processor configured to:

receive, from a first device, a request to process an old message;

after reception of the request, transcribe voicemail contents of the old message into text for a new message;

send, to the first device, a confirmation that the voicemail contents of the old message have been transcribed into the text for the new message;

after sending the confirmation, generate a notification that includes an old unique identification (UID) value for the old message, a new UID value for the new message, and a change type value indicating a type of transformation from the old message to the new message; and a transmitter configured to transmit, independent of an Internet message access protocol (IMAP) synchronization procedure with the first device, the generated notification to a second device that is different from the first device, wherein upon receiving the generated notification by the second device, the second device determines whether a message having the old UID value is stored in a voicemail inbox, wherein if the message having the old UID value is determined by the second device to be stored in the voicemail inbox, the message having the old UID value is expunged, and the new message with the new UID value is created, and wherein a specific icon is displayed next to the new message based on the change type value included in the notification.

5. The server of claim 4, wherein the processor is further configured to send, to the first device, the new message comprising contents of the old message and new contents, and receive, from the first device, a confirmation regarding the new message, in accordance with the IMAP synchronization procedure.

6. The server of claim 4, wherein the generation and transmission of the notification supports Enhanced Visual Voice Mail (EVVM) technology in Open Mobile Alliance (OMA) standards that allow for voicemail retrieval via a plurality of devices for a single user.

* * * * *